United States Patent

Hain

[15] 3,661,256
[45] May 9, 1972

[54] MAIL HANDLING AND SEPARATING APPARATUS

[72] Inventor: Eugene T. Hain, St. Davids, Pa.
[73] Assignee: Burroughs Corporation, Detroit, Mich.
[22] Filed: May 6, 1970
[21] Appl. No.: 35,086

[52] U.S. Cl. .............................................. 209/74, 209/121
[51] Int. Cl. ...................................................... B07c 5/20
[58] Field of Search ..................... 209/121, 73, 74, 86, 45, 95

[56] References Cited

UNITED STATES PATENTS

| | | | |
|---|---|---|---|
| 2,473,215 | 6/1947 | Oslund | 209/45 |
| 2,672,235 | 3/1954 | Freeman | 209/95 |
| 3,279,598 | 10/1966 | Barnard et al. | 209/72 |

*Primary Examiner*—Allen N. Knowles
*Assistant Examiner*—Gene A. Church
*Attorney*—Paul W. Fish, Edward J. Feeney, Jr. and Charles S. Hall

[57] ABSTRACT

An automatic vacuum culling apparatus for separating relatively large, bulky items from relatively thin, flat, lightweight items in which a vacuum is created through perforations along a portion of the side wall of a tilted, rotating drum. Lightweight, relatively flat items are attracted by suction against the side wall of the drum and are rotated to the top thereof where the vacuum terminates. These items then drop into a chute which funnels the items to a conveyor for transportation outwardly away from the culler. Heavyweight and relatively bulky items, being too large to be adhered by suction against the side wall of the rotating drum, tumble out the lower end of the tilted drum onto a second conveyor belt for transportation away from the culler.

4 Claims, 8 Drawing Figures

INVENTOR.
EUGENE T. HAIN

AGENT

MAIL HANDLING AND SEPARATING APPARATUS

BACKGROUND OF THE INVENTION

The present invention relates to an item handling and separating apparatus and more particularly, although not necessarily exclusively, to an automatic item handling and separating apparatus for use with items such as Post Office mail which includes packages as well as letters and magazines. With still more specificity, the invention has to do with apparatus for automatically vacuum culling and separating items by relative weight and surface area by means of a pressure differential across a portion of a tilted, rotating drum through which said items are automatically transported.

The apparatus has particular utility in automatic vacuum culling of "raw" or unsorted mail to separate all packages and similar documents which cannot be machine processed and special items of a size which cannot be automatically handled from items such as letters, postcards and other similar documents within a particular size and weight range which can be processed by automatic machines.

In general, it has been found desirable in automatic separation and handling of packages and letters to first separate letters from the packages and then to remove oversized and special letters from the general assortment of letter documents. A number of different approaches have been suggested, some of which have failed in great measure. One such known apparatus includes a horizontal conveyor belt with a rotatable drum mounted above the belt with its axis horizontal but at an angle with respect to the direction of travel of the belt. The bottom of the drum is located at a slight distance above the belt, e.g., a quarter of an inch above, and is rotated in a direction in opposition to the travel of the belt. Items such as mail traveling on such a conveyor belt which are less than a quarter of an inch thick, for example, pass easily under the drum while larger sized items such as packages and mail which are over a quarter of an inch thick are swept off the side of the belt by the counter revolving drum.

A definite disadvantage of such equipment is the danger of damaging the mail. Also there is the added risk that it can in some instances remove letters together with packages.

It, therefore, is an important object of this invention to provide an apparatus for rapidly and safely separating from large quantities of unsorted bulk mail those items which can be processed automatically.

SHORT STATEMENT OF THE INVENTION

Accordingly, the present invention provides an automatic vacuum culling apparatus in which a drum having each end open is rotated with the lower edge of one end positioned higher than the lower edge of the other end. A vacuum is established in a chamber mounted slideably with and contiguously about the raising side wall portion of the rotating drum, i.e., about a peripheral side wall portion, and is conveyed to the drum's internal side wall through a plurality of perforations extending therethrough. Items to be sorted are deposited into the raised end portion of the drum and those items having a relatively low weight-to-surface area ratio are suctioned against or adhere to the side wall by the vacuum and are raised to the top of the drum where the vacuum terminates. These items then fall under the force of gravity onto means for transporting them away out of the drum. Other items having a relatively high weight-to-surface area ratio are not raised to the top of the drum but rather are tumbled out the open, lower end of the drum and transported away.

These and other objects, advantages, and features of the invention will become more fully apparent from the following detailed description, appended claims, and accompanying drawings, in which:

Figure 3:
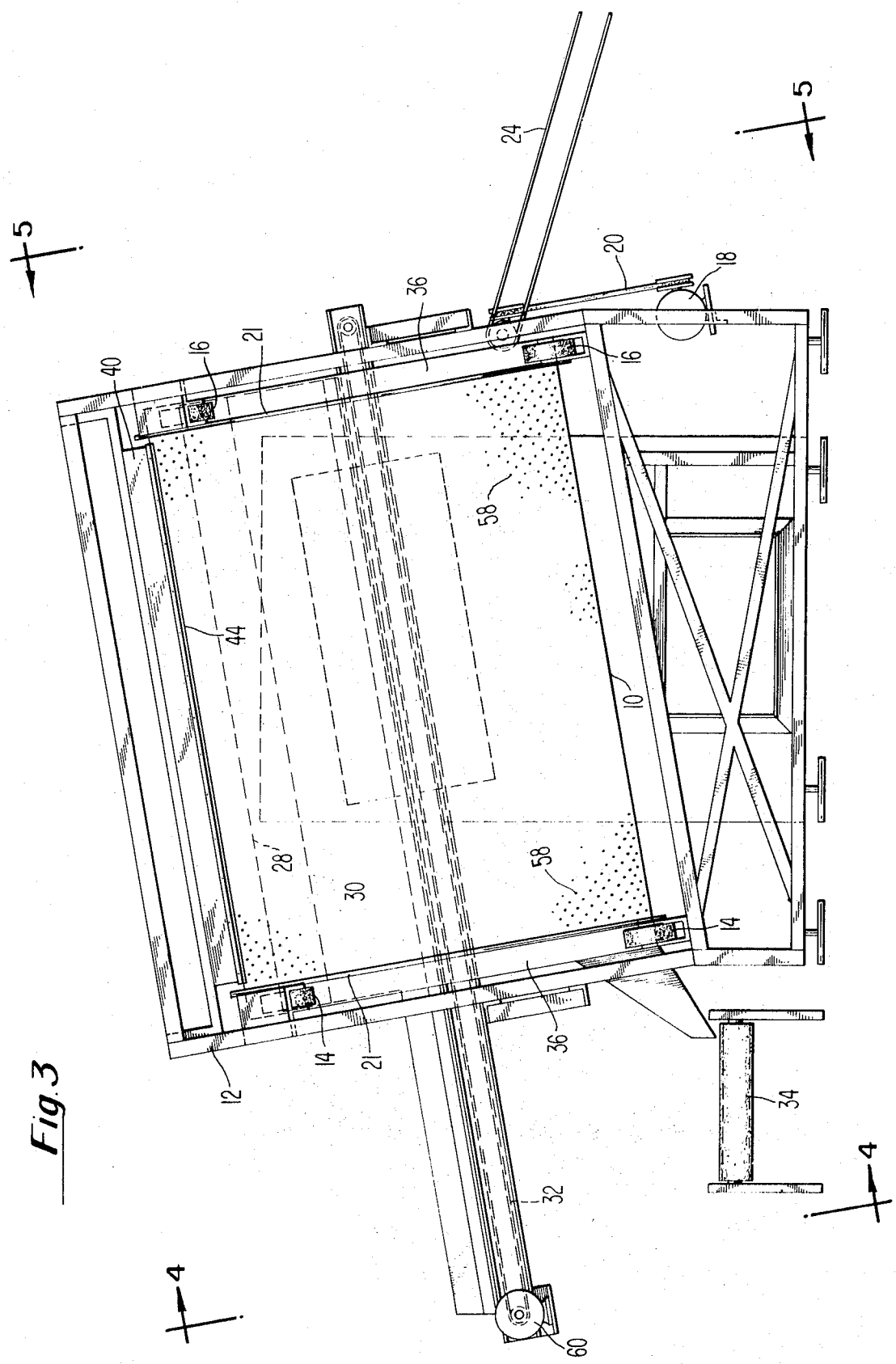
FIG. 3 is a side elevational view of the preferred embodiment of the invention.
Figure 4:
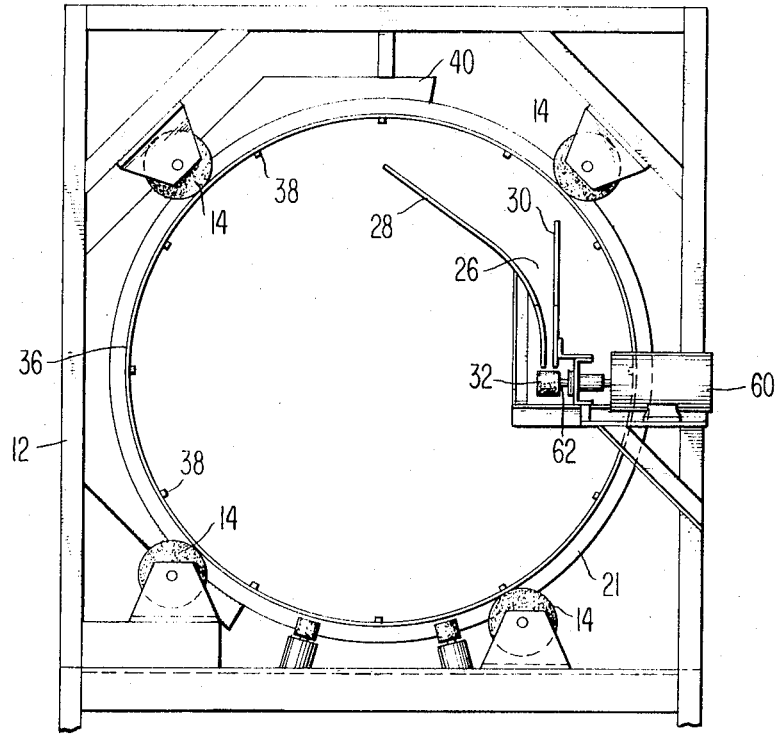
Figure 5:
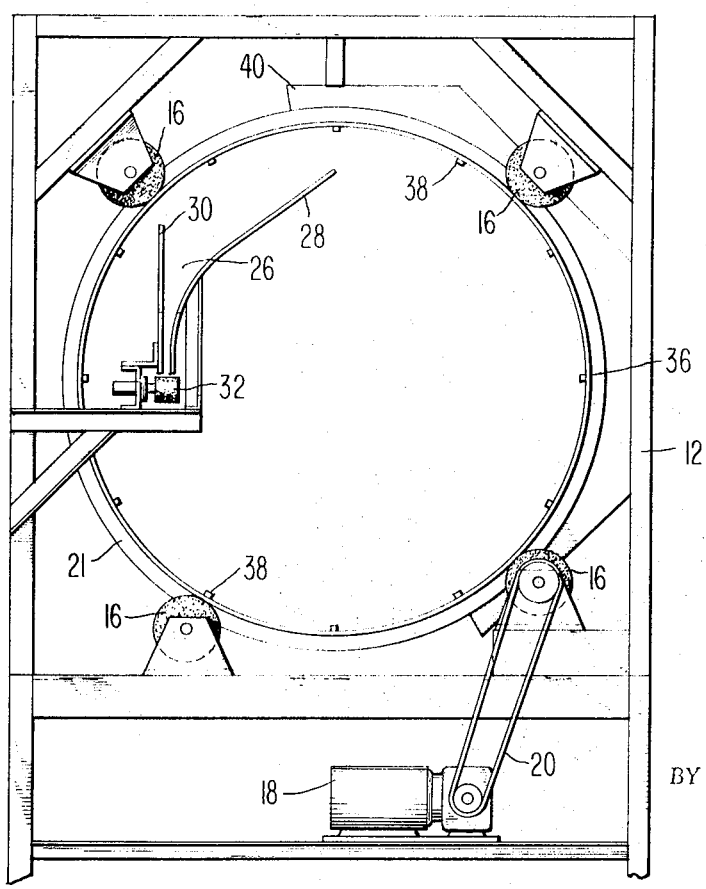
Figure 6:
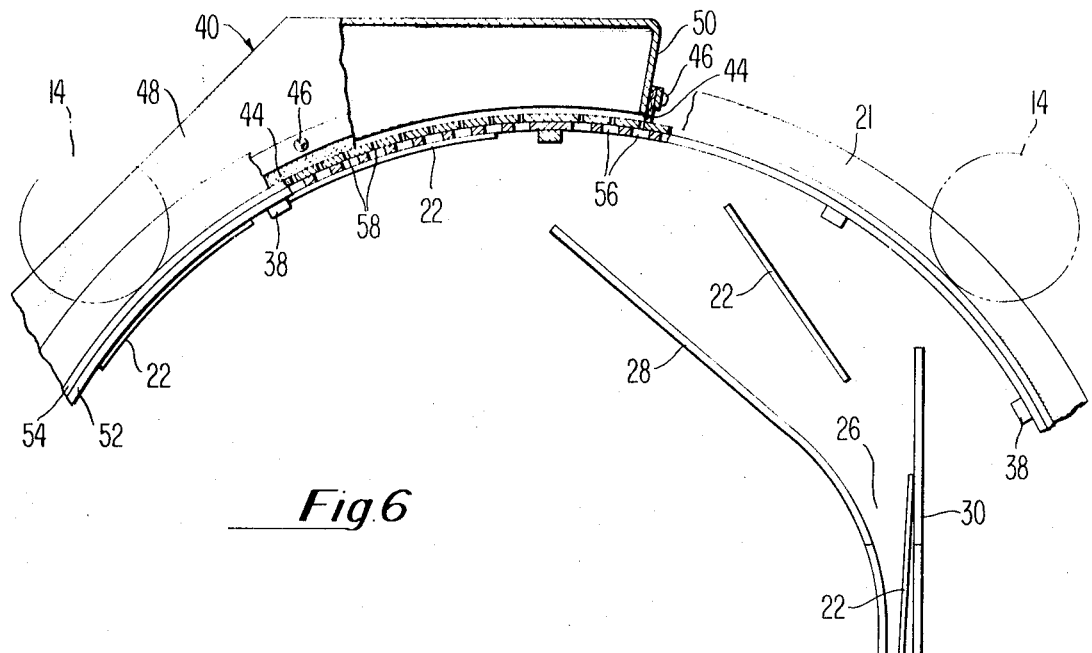
Figure 7:
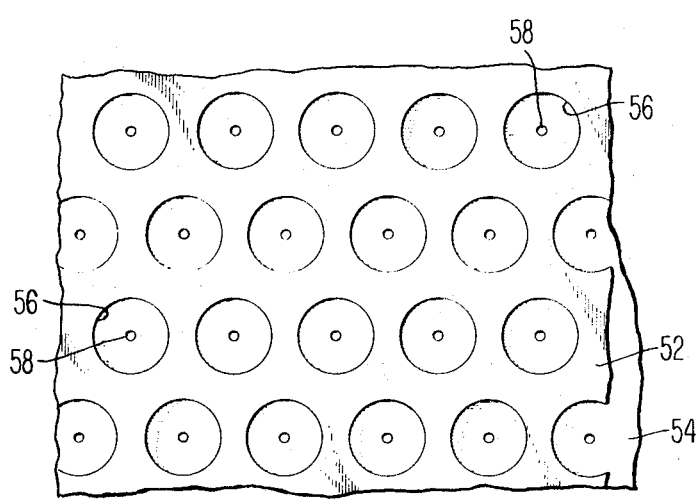

FIGS. 4 and 5 are front and rear views respectively of the invention taken along the lines 4—4 and 5—5 respectively of FIG. 3;

FIG. 6 is a detail view of the upper front portion of the drum of the invention partially cut away to expose the drum construction as well as the vacuum retaining arrangement;

FIG. 7 is an enlarged detail view of a portion of the drum surface; and

Figure 8:
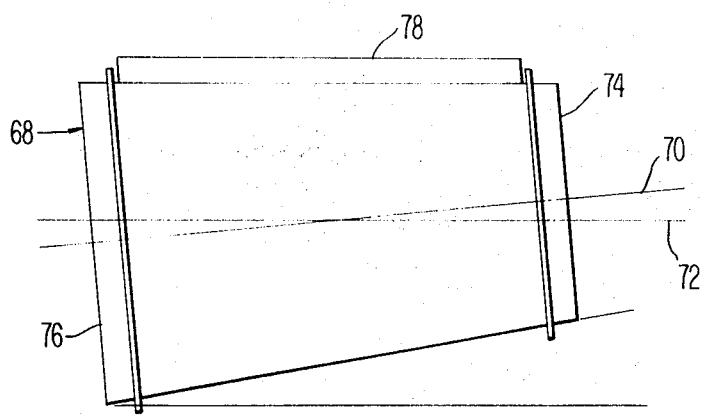

FIG. 8 is a schematic side view of an alternate embodiment of the present invention.

Figure 1:
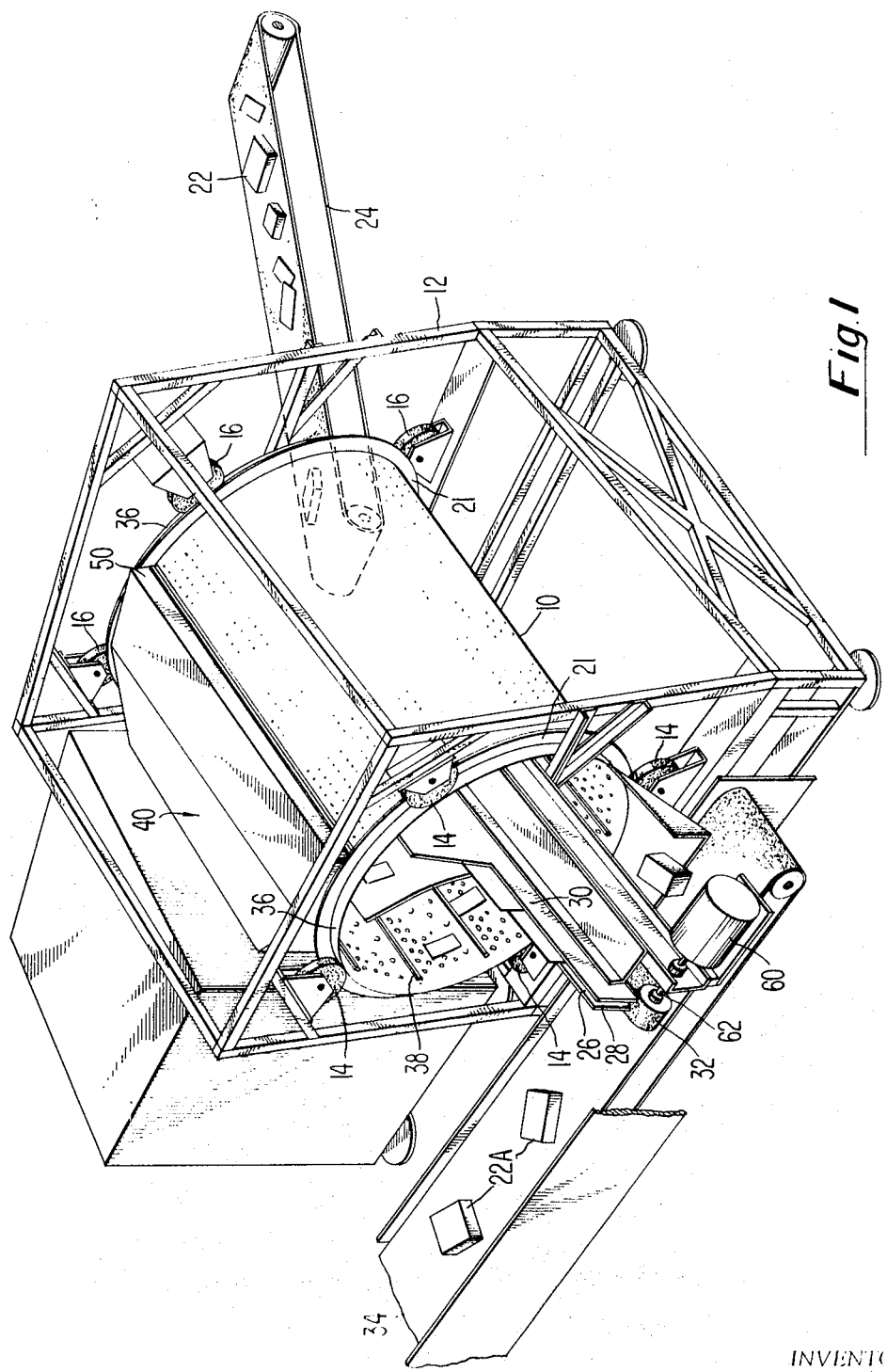
FIG. 1 is a perspective view of apparatus embodying the present invention.

FIG. 1 is a perspective view of the preferred embodiment of the invention showing a hollow, elongated drum 10 rotatably supported within an open framework 12 by means of a plurality of rubber-tired rollers 14 and 16 (front and rear respectively) rotatably mounted thereto. Drum 10 is rotatably actuated by means of a variable speed motor 18 through belt 20 through connection with roller 16, as shown in FIG. 3.

The drum receives course input bulk mail 22, FIG. 1, from input conveyor 24. The mail, including letters, books, magazines, packages, etc., is dropped from conveyor 24 to the bottom of drum 10 at the upper raised right hand end thereof, as viewed in FIGS. 1 and 3. Items of mail having a relatively low weight-to-area ratio are caused to be drawn or sucked by vacuum to adhere against the leftwardly rising portion of the side wall of the drum as the drum is rotated clockwise in FIGS. 1, 2 and 4 in a manner to be described presently. These lightweight items, e.g., letters, are carried to the top of the drum 10 where the vacuum control (still to be described) terminates.

The letters then drop under the force of gravity into chute 26. The generally vertically disposed side walls 28 and 30 of chute 26 cause the letters to stand on end. The letters are then transported axially out of the drum by means of conveyor 32 in the bottom of the chute for further processing. Larger bulk items, e.g., books and packages, having a relatively high weight-to-area ratio are not suctioned against the side walls of the drum 10 because the suction level, as hereinafter described, is not sufficiently great. Thus, these items 22A, FIG. 1, are tumbled out of the rotating, tilted drum onto conveyor belt 34 where they are transported, e.g., at right angles to drum 10, for further processing.

Figure 2:
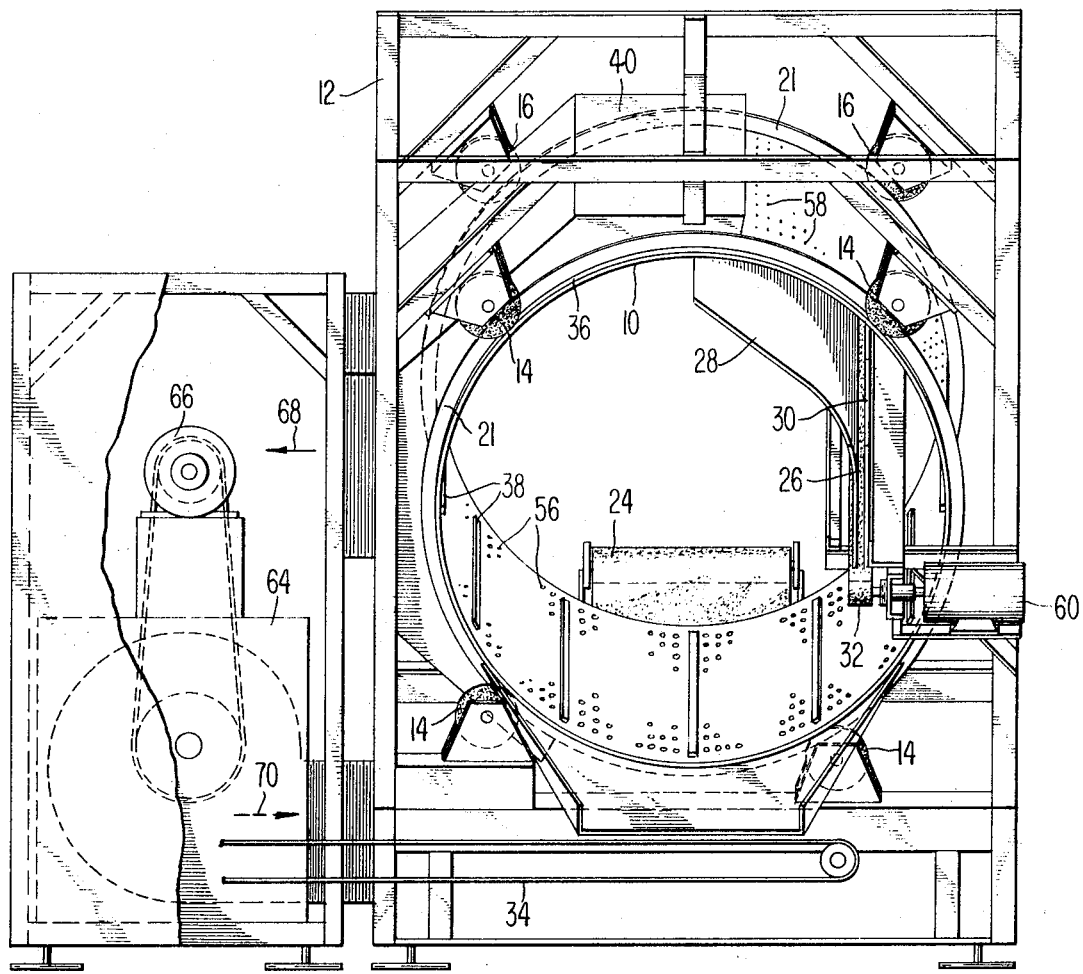
FIG. 2 is a front end view of the apparatus of FIG. 1.

Reference is now made to FIG. 2 for a more detailed discussion of the preferred embodiment of the apparatus of this invention. Drum 10 is bordered at each end by a race 36 which maintains the drum in position and prevents it from sliding longitudinally due to its tilted condition relative to the horizontal axis. A plurality of ribs 38 are fixedly attached to the inside wall, and parallel to the longitudinal axis of the drum. These ribs provide rigidity to the drum, and, as hereinafter will be explained, aid in sorting the items to be culled.

A vacuum chamber 40 is mounted contiguously about a peripheral portion of drum 10. Vacuum chamber 40 is rigidly supported by drum support 12 and covers approximately one-half of the drum external peripheral surface area. The vacuum chamber 40 is positioned on the side of the drum that rises during rotation as illustrated by arrow 42 indicating clockwise rotation of the drum. An insulator lining 44, FIG. 6, is provided to isolate the interior of the vacuum chamber 40 from atmospheric pressure. The insulator is positioned and secured about the periphery of chamber 40 as by bolts 46 where the side walls 48 and end walls 50 of the chamber terminate proximate the drum. The insulator 44 may be of any resilient, nonporous material such as rubber, which will not only provide a flexible interface between the rotating drum and stationary vacuum chamber, but also will wear well under the constant sliding friction of drum 10 against the side and end walls 48 and 50, respectively.

In the preferred embodiment, drum 10 is approximately 4 feet in diameter and 6 feet long and is made of sheet metal consisting of two sheets 52 and 54, FIG. 6, laminated together by means of a mastic compound as known in the art. As shown in FIGS. 6 and 7, the inside sheet layer 52 of drum 10 has a plurality of relatively large diameter holes 56, FIG. 7, therethrough. Outer sheet 54 has a plurality of relatively small diameter holes 58 therethrough with the center axis of holes 58 being aligned with the center of the holes 56. Thus, a vacuum may be established in a manner hereinafter described along the inside wall of drum 10 from chamber 40 over a relatively large drum area and therefore over a wide area of the items of mail being fed into the drum.

The weight-to-area ratio of the individual mail items defines the average suction pressure required to be applied to the surface of the mail in order to exert on the mail a force of the same magnitude as the weight of the mail. This threshold suction pressure level is required because the items of mail when carried to the top of the drum as viewed, for example, in FIGS. 1 and 2, will be pulled away from the drum by a force equal to the weight of the items. When this suction level is obtained, the mail items desired to be culled from the heavier packages will cling to the side wall of drum 10 up to the top of the drum where the maximum opposing gravitational force will be exerted. By formula, this relationship can be expressed as follows:

$$P = W/A$$

where $W$ represents the weight of the culled item, $A$ represents the surface area of the item over which the suction force is exerted, and $P$ represents the average suction force. Thus, as $A$, the suction area of the item being culled, increases, the suction pressure can be decreased. Therefore, holes 56 through inside wall 52 are made relatively large and are spaced close together so that the maximum possible area of the items being culled is exposed to the suction pressure from vacuum chamber 40.

The suction force is directed perpendicular to the side wall 52 of drum 10 and alone is not sufficient to prevent the suctioned items from sliding along the wall to the bottom of the rotating drum. In order to prevent such sliding action, rib sections 38 are provided which are rigidly attached to the side wall of the drum. These ribs are small enough to prevent interference with the packages deposited in the drum yet large enough to prevent letters or other relatively light items from sliding along the inside wall. The ribs 38, in addition, provide internal support for the drum itself.

Guide chute 26, FIG. 6, with arcuate wall 28 and vertical wall 30 collect and stand upright the lightweight and flat articles dropped therein from the drum 10. Walls 28 and 30 are positioned on opposite sides of the conveyor belt 32. As items 22 (letters) are dropped into the chute they are funneled onto belt 32 and transported away from the drum. The conveyor 32 is powered by means of an electric motor 60 through shaft 62, as shown in FIGS. 1, 2, 3 and 4.

Heavier items 22A (packages, flats, etc.) are not suctioned against the side wall of the drum because the suction pressure transferred from chamber 40 to the inside of the drum is not sufficiently great for this action. In addition, some relatively lightweight items such as light but bulky packages are not suctioned against the side wall because of two forces acting thereon. The first force is the weight of the bulk item itself in relation to the total surface area being exposed to the vacuum suction force. Thus, if the bulk item has a relatively small amount of its surface area which is exposed to the vacuum, the weight-to-surface area ratio may be relatively large, and the vacuum suction pressure will not be sufficient to cull these items from the "raw" mail deposited in the drum. The second force acting on bulk items is a couple caused by the fact that the center of gravity of bulk items is displaced away from the surface of the drum. Thus, the gravity vector acting upon the items tends to cause the items to rotate away from the side wall of the drum. This tumbling motion, as hereafter will be explained, helps to separate larger bulky packages from the raw collection of mail.

By using a single vacuum chamber mounted flush against the outside wall of drum 10, complicated structures such as combinations of vacuum distributors and pipes for establishing a vacuum are not necessary. Since the number of moving parts has been reduced, the vacuum chamber arrangement of the present invention adds to the overall reliability of rapid, automatic mail culling.

An air foil blower 64 powered by a motor 66 or other suitable means may be used to produce the vacuum in chamber 40. Air is sucked "inwardly" in the direction of arrow 68 and is expelled "outwardly" in the direction of arrow 70 causing a vacuum to exist throughout the whole extent of chamber 40. Depending upon the speed of the rotating drum 10, the number of ribs 38 along the inside thereof, and the quantity of mail 22 being deposited in the drum, the vacuum force created by blower 64 may be varied. In the preferred embodiment of the invention, a vacuum level of 3.5 inches of water to 6 inches of water has proved sufficient to suction relatively lightweight letters and other items having a low weight-to-surface ratio, i.e., machinable mail, against the drum side wall while leaving larger items to tumble out the lower end of the drum as seen most clearly in FIG. 1.

As depicted in FIG. 1, drum 10 is tilted at an angle which in the preferred embodiment is approximately 10°. Bulk packages dropped into the inside of the drum from a conveyor 24 are tumbled from the relatively high raised end of the drum to the relatively low output end and onto conveyor 34 as the drum rotates. The angle of tilt may be varied according to the quantity of mail desired to be processed. However, if the angle of tilt becomes too steep, letters may tumble out the end of the drum and onto the conveyor 34 before they have had a chance to be suctioned against the side wall of the drum. Alternatively, the angle of tilt should not be too small, otherwise, the quantity of mail which the drum is capable of processing will be decreased. In such case bulk items of mail deposited therein will tumble for a greater period of time within the drum, thereby backing up the separation of the mail and preventing letters from making contact with the side wall.

The speed of rotation of the drum may be increased or decreased as one desires; however, it has been found that if the speed of the drum becomes too great, letters suctioned to the side wall thereof when moving past upper end wall 50 of vacuum chamber 40 will not drop into chute 26 as desired, but rather will continue on past vertical chute wall 30 and back down to the bottom of the drum. On the other hand, it has been found that if the speed of rotation of the drum is decreased to less than 14 revolutions per minute, large quantities of mail cannot be rapidly processed and separated because the mail deposited therein from conveyor 24 tends to accumulate thereby causing a saturation effect on the drum. This means that letters deposited in the drum will have to travel farther down the longitudinal length of the drum to reach an exposed vacuum area on the left side wall of the drum. In practice, it has been found that speeds ranging from 14 to 21 revolutions per minute provide an optimum operating range for culling "raw" mail.

FIG. 8 is a schematic side elevation view of an alternate embodiment of the invention which shows a truncated cone 68, the sides of which are angled 10° from the horizontal and having its longitudinal axis 70 tilted 10° from the horizontal axis 72 and having its small diameter open end 74 positioned to receive mail from an input conveyor, hot shown, and having its large diameter open end 76 positioned to drop bulky packages onto an output conveyor, hot shown. In this embodiment, the vacuum chamber 78 must necessarily be configured to cover the truncated section of the outer wall of the cone 68. As in the first and preferred embodiment of the invention, a vacuum is established in the vacuum chamber 78 for suctioning letters against the side wall of cone 68 for transporting relatively lightweight letters to the top thereof and for tumbling relatively heavy or bulky packages and overweight letters out the large diameter end of the cone 68. The lightweight items are dropped as before into a chute, not shown, when they reach the top of the cone. These items are stood on end by the chute and funneled onto a conveyor belt, as explained in connection with FIG. 1. The conveyor belt then transports these lightweight items away from cone 68. Heavier bulk items are tumbled along the bottom of cone 68 until they drop out of the large diameter end 76 of the cone onto a conveyor for transportation away from the cone. The configuration of the holes in the side wall of cone 68 and the suction pressure exerted therethrough may be the same as in the preferred embodiment. Additionally, the speed of rotation of the cone has the same effect on packages and letters deposited therein as did the speed of rotation of the drum 10 in the preferred embodiment.

I claim:

1. In a mail sorting machine having an endless belt for conveying mail items to be sorted, apparatus for handling and separating said mail items comprising a hollow cylindrical drum having its opposite ends open and its longitudinal axis tilted with respect to a horizontal plane and with the lower edge of one end positioned higher than the lower edge of the other end, said drum constructed of a cylindrical inner sheet and a cylindrical outer sheet bonded together, the inner sheet provided with relatively large diameter closely-spaced holes extending therethrough and the outer sheet provided with relatively small diameter holes extending therethrough each in communication with one of said relatively large diameter holes, said drum also having a circular race along opposite edge portions, each circular race bordered by an annular flange at its inner end secured to and projecting outwardly from the drum periphery, said endless belt having its delivery end positioned adjacent to the higher end of the drum for conveying and depositing a mixture of flexible substantially flat letter mail items and relatively large bulky package mail items of random size and weight into the higher end of the drum, a plurality of spaced ribs fixed to the inside surface of the drum and aligned substantially transverse to the direction of rotation of the drum, the space between adjacent ribs being such as to accommodate therebetween the longest dimension of suctionable mail items, drive rollers supporting and rotating the drum on its circular races and straddling said annular flanges so as to captivate the drum axially in opposite directions, means for suctioning mail items having a relatively low weight-to-area ratio against the rising portion of the side wall of the rotating drum comprising a vacuum chamber positioned contiguously about the outside and rising portion of the side wall of the drum, and means for creating a vacuum in said vacuum chamber so that it is transferred to the inside of the rising portion of said side wall through the communicating holes in said inner and outer sheets, and means for collecting said relatively low weight-to-area ratio mail items after they have been rotated to the top of the drum under the cooperative control of said vacuum and ribs comprising a stationary arcuately-shaped sheet and a stationary plane substantially vertical sheet, disconnected from each other and spaced to form a funnel-shaped open-bottom trough for receiving therein mail items that have been released from the vacuum at the top of the drum, the lower ends of said arcuately-shaped sheet and plane sheet being substantially vertical and close together so as to guide each received mail item into a substantially vertical position, and an endless conveyor belt having its broad surface adjacent to and substantially perpendicular to the lower ends of said arcuately-shaped sheet and plane vertical sheet for receiving and conveying each received mail item on edge away from the drum, and wherein the mail items having a relatively high weight-to-area ratio and not suctioned against the side wall of the drum are tumbled out of the lower end of the drum by the rotation of the drum.

2. Apparatus according to claim 1 wherein the force of said vacuum is insufficient of itself to prevent the suctioned mail items from sliding along said side wall to the bottom of the drum.

3. Apparatus according to claim 2 characterized further by the provision of means for insulating the interior of said vacuum chamber from atmospheric pressure.

4. Apparatus according to claim 3 wherein said insulating means is constructed of resilient nonporous material and secured to the periphery of said vacuum chamber and in sliding contact with the periphery of the drum.

* * * * *